(12) United States Patent
Arnould et al.

(10) Patent No.: US 8,813,642 B2
(45) Date of Patent: Aug. 26, 2014

(54) AGRICULTURAL RAM PRESS

(75) Inventors: Cyrille Arnould, Montoy-Flanville (FR); Ulrich Hesselmann, Perl (DE); Marc Altmeyer, Alzing (FR)

(73) Assignee: Usines Claas France S.A.S., Woippy Cedex (FR)

( * ) Notice: Subject to any disclaimer, the term of this patent is extended or adjusted under 35 U.S.C. 154(b) by 435 days.

(21) Appl. No.: 13/236,808

(22) Filed: Sep. 20, 2011

(65) Prior Publication Data

US 2012/0073457 A1 Mar. 29, 2012

(30) Foreign Application Priority Data

Sep. 23, 2010 (DE) .......................... 10 2010 037 722

(51) Int. Cl.
*B30B 15/30* (2006.01)
*A01F 15/10* (2006.01)

(52) U.S. Cl.
CPC ......... *A01F 15/101* (2013.01); *A01F 2015/102* (2013.01)
USPC ............................ 100/188 R; 100/7; 100/215

(58) Field of Classification Search
CPC ... A01F 15/0825; A01F 15/10; A01F 15/101; A01F 2015/102; A01D 89/008; A01D 43/006
USPC ................. 100/4, 43, 45, 48, 49, 100, 215, 7, 100/188 R; 56/10.2 R, 10.2 A, 10.2 C, 10.2 G, 56/14.7, 341, 343, 432, 433
See application file for complete search history.

(56) References Cited

U.S. PATENT DOCUMENTS

| | | | | |
|---|---|---|---|---|
| 6,073,426 A | * | 6/2000 | Mesmer et al. | ............ 56/10.2 R |
| 6,105,353 A | * | 8/2000 | Mohr et al. | ..................... 56/341 |
| 6,862,876 B2 | * | 3/2005 | Amstel Van et al. | ............ 56/341 |
| 7,398,728 B2 | * | 7/2008 | Hel | ................................ 100/45 |
| 2002/0174781 A1 | * | 11/2002 | Leupe et al. | .................... 100/88 |

FOREIGN PATENT DOCUMENTS

| | | | |
|---|---|---|---|
| DE | 10360589 A1 | * | 7/2005 |
| EP | 1 769 674 | | 4/2007 |
| EP | 2022319 A1 | * | 2/2009 |

* cited by examiner

*Primary Examiner* — Jimmy T Nguyen
(74) *Attorney, Agent, or Firm* — Michael J. Striker

(57) ABSTRACT

An agricultural ram press has a bale chamber, a baling ram moveable in an oscillating manner in the bale chamber, a feed channel, a feed rake arranged in the feed channel and switchable between a gathering stroke motion which compresses crop in the feed channel and a filling stroke motion which moves the crop from the feed channel into the bale channel, and a drive for driving the feed rake and having a control rod interacting with an adjustable stop to control at least one of the motions of the feed rake.

10 Claims, 2 Drawing Sheets

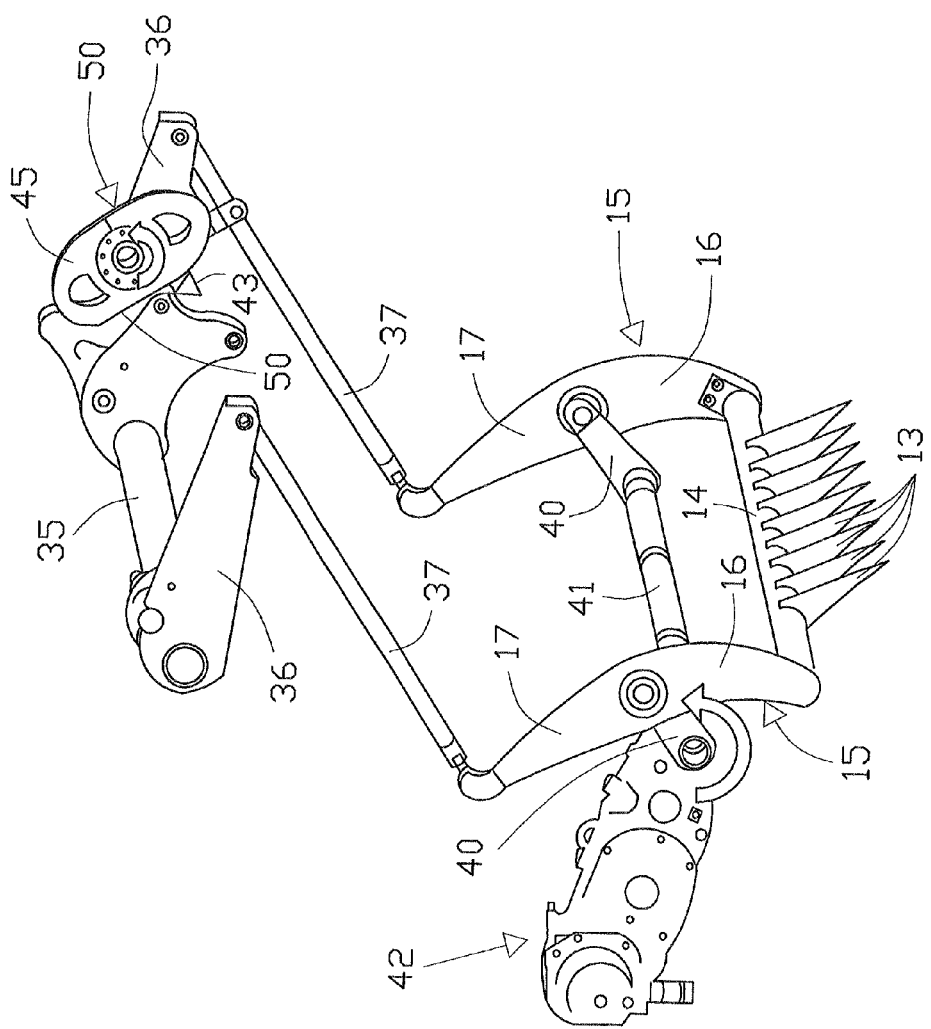

AGRICULTURAL RAM PRESS

CROSS-REFERENCE TO RELATED APPLICATION

The invention described and claimed hereinbelow is also described in German Patent Application DE 10 2010 037 722.8 filed on Sep. 23, 2010. This German Patent Application, whose subject matter is incorporated here by reference, provides the basis for a claim of priority of invention under 35 U.S.C. 119(a)-(d).

BACKGROUND OF THE INVENTION

The present invention relates to an agricultural ram press with which crop picked up from a cultivated field is pressed into bale form. Such a ram press is known from EP 1 769 674 B1, for example.

This conventional ram press comprises a bale chamber in which a ram is driven in an oscillating manner in order to compress the crop conveyed into the bale chamber into a bale. The crop reaches the bale chamber via a pick-up device which gathers the crop from the cultivated field, and a feed channel in which a feed rake moves. The feed rake performs two motions, specifically a gathering stroke, in which the feed rake is adjacent to the entrance of the feed channel and enters it and then moves only through a front region of the feed channel in order to pull crop—that has been freshly conveyed into the feed channel—away from the entrance and precompress it in a rear region of the feed channel to create space at the entrance for subsequently arriving crop, and a filling stroke, in which the feed rake moves from the entrance to an exit, and which conveys the crop gathered and precompressed in the feed channel out of the feed channel and into the bale chamber.

The feed rake comprises a two-arm feed rake lever which has agitator tines—which enter the feed channel—on the end of a first arm; the end of the second arm is hinge-mounted to a feed rake coupling rod, and a pivoting point between the two arms makes a motion on a circular trajectory, driven by an eccentric. An end of the coupling rod facing away from the feed rake lever is hinge-mounted to a feed rake control rod. When the feed rake control rod is at rest while the pivoting point of the feed rake lever moves along its circular trajectory, the joint that connects the coupling rod to the second arm of the feed rake lever moves on a circular arc, and the agitator tines make gathering-stroke motions on an elliptical trajectory that is elongated in the horizontal direction.

To control a filling stroke, the feed rake control rod is coupled via a piston rod to the drive of the baling ram and undergoes a swivel motion which causes the agitator tines to follow a sickel-like path.

In the ideal case, the agitator tines should enter the entrance of the feed rake channel at a steep angle, in both a gathering stroke and a filling stroke, and then move with minimal clearance from the bottom of the channel in order to capture all of the crop in the feed rake channel. At the end of a feed rake stroke, the agitator tines should exit the channel at a steep angle, wherein the exit point should be selected such that a precompressed crop body remains in the feed channel, the length of which corresponds exactly to the height of the bale chamber, thereby enabling it to evenly fill the entire cross section of the bale chamber when it is conveyed into it using a filling stroke. In a filling stroke, however, the tines should continue following the base of the chamber to the exit thereof, and then exit. It is difficult to fulfill these requirements in a satisfactory manner using the conventional drive mechanism.

Since the feed rake control rod is moved continuously during the filling stroke, the trajectories of the agitator tines can coincide during the filling stroke and the gathering stroke only at points, although exact conformity of the trajectories in a front region of the feed rake channel would be extremely practical.

SUMMARY OF THE INVENTION

The problem addressed by the invention is therefore that of creating a baler, the feed rake drive of which ensures a higher degree of freedom in terms of defining the trajectories of the feed rake motion.

The problem is solved in that, in the case of an agricultural ram press comprising a bale chamber in which a baling ram can move in an oscillating manner, a feed channel in which a feed rake can be switched between a gathering motion, with which crop is compressed in the feed channel, and a filling motion that moves the crop from the feed channel into the bale chamber, a drive of the feed rake comprises a control rod that interacts with an adjustable stop to control at least one of the motions of the feed rake.

The adjustable stop is preferably in the form of a rotatably drivable cam track. Since it is given a suitable shape, any correlation between a phase of the rotary motion of the cam track and the resulting deflection of the control rod can be implemented.

To minimize friction and wear, the control rod preferably carries a roller that impinges upon the cam track.

Rapid movement of the feed rake is desirable in order to quickly remove the crop, which is delivered continuously to the entrance of the feed channel, and precompress it in small portions, although the period of time in which the baling ram is moving can be much longer than that of the feed rake. If the frequency of the feed rake motion is n-fold the frequency of the ram motion, the cam track, which rotates at the frequency of the piston motion, can comprise n identical sectors in order to control n cycles of the feed rake motion per ram motion.

In a preferred embodiment, the motion of the feed rake in which the control rod interacts with the adjustable stop is the gathering stroke motion.

If the adjustable stop drives a motion of the control rod having the same period as the motion of the feed rake, then the path covered by the feed rake can be influenced arbitrarily via the course of this motion.

To force the control rod to follow a motion of the adjustable stop, the control rod preferably impinges upon the adjustable stop by way of an elastic element.

In order to guide the feed rake along a trajectory, at least in sections, during the filling motion stroke that differs from that of the gathering stroke motion, a coupling element can be provided that holds the control rod away from the stop at least during a portion of the filling stroke motion.

This coupling element is preferably a coupling rod which can be switched between an adjustable-length state in which it does not overcome the force of the elastic element, and a locked-length state in which it transfers a force to the control rod that is sufficient for overcoming the elastic element.

The coupling element can be driven by a drive shaft that also drives the baling ram.

Further features and advantages of the invention will become apparent from the description of embodiments that follows, with reference to the attached figures.

BRIEF DESCRIPTION OF THE DRAWINGS

FIG. 2 shows a perspective view of the feed rake mechanism of the ram press in accordance with the present invention.

DESCRIPTION OF THE PREFERRED EMBODIMENTS

Figure 1:
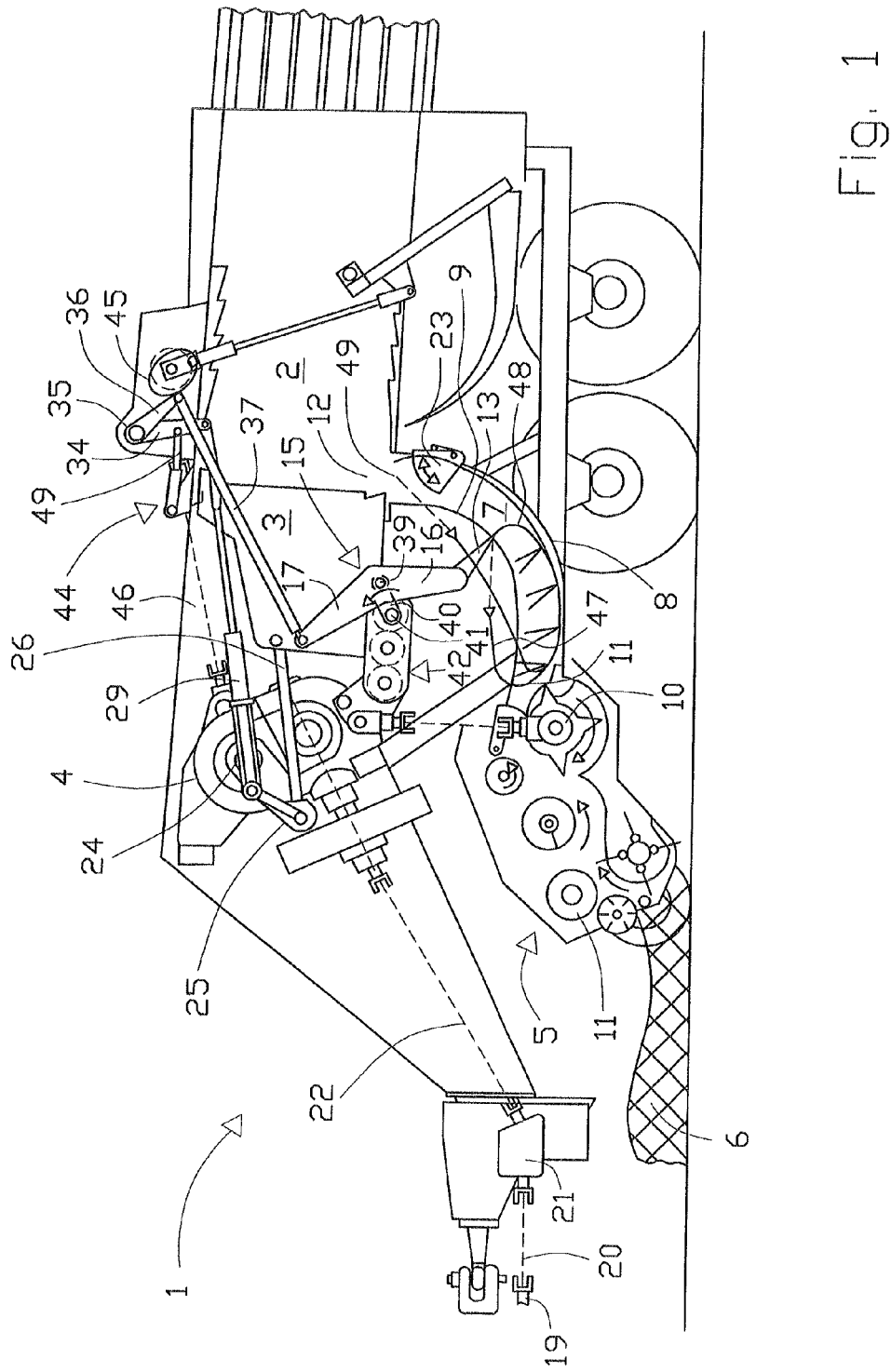
FIG. 1 shows the ram press in a side view in accordance with the present invention.

Ram press 1 shown in a schematic side view in FIG. 1 is designed as a trailer to be coupled to a towing vehicle which is not depicted. It comprises a pick-up device 5, which is also referred to as a pick-up, for picking up crop 6 from the ground.

The crop, which has been gathered by pick-up device 5 and fragmentized by a cutting device 10, is conveyed to an entrance 11 of a feed channel 7, the exit 16 of which leads into a bale chamber 2. A baling ram 3, which can move back and forth in bale chamber 2, compresses the supplied crop, wherein compressed crop located further downstream in bale chamber 2, and finished bales serve as an abutment for the compression.

Feed channel 7 extends in the shape of a curve between entrance 11 thereof and exit 16, and is bounded by a concave base 8 and a cover 9. Cover 9 comprises a plurality of longitudinal slots through which agitator tines can enter feed channel 7. As shown in FIG. 2, agitator tines 13 are mounted on a crossmember 14 at regular intervals. Two feed rake levers 15 each comprise two arms 16, 17 which form an obtuse angle relative to one another and meet at an axle 39. Lower arms 16 of the two feed rake levers 15 hold crossmember 14. Axle 39 is driven by two feed rake cranks 40 on a circular path about an output shaft 41. Output shaft 41 is coupled via a spur gearbox 42 to a main gearbox 4 which, in turn, is coupled via a universal drive shaft 22, a bevel gear 21, and a further universal drive shaft 20 to the towing vehicle which supplies it with drive energy.

The free end of upper arm 17 of each feed rake lever 15 is hinge-mounted via a feed rake coupling rod 37 to a control rod 36 which is disposed above bale chamber 2 and can pivot about an axis defined by a control shaft 35. Control rod 36 is acted upon by a spring element, which is a gas strut 44 in this case, in the counterclockwise direction, and therefore a roller 43 carried by control rod 36 rests on the circumference of a cam track 45. The circumference of cam track 45 comprises two identical sectors 50, each of which extends across half of the circumference. It is coupled via a universal drive shaft 46 to main gearbox 4.

In the depiction shown in FIG. 1, an output shaft 24 of main gearbox 4 is hidden behind a telescopic rod 29, one end of which is hinge-mounted to control rod 36, and the other end of which is hinge-mounted on a piston crank 25 driven by output shaft 24. Piston crank 25 drives the back and forth motion of baling ram 3 via a connecting rod 26.

Provided that telescopic rod 29 is not in a locked-length state, the motion of its end acting on piston crank 25 does not affect control rod 36. The position thereof is therefore defined solely by the orientation of cam track 45, against which roller 43 is pressed via gas strut 44. Cam track 45 rotates at the same frequency as output shaft 24, and so, over the course of one oscillation of baling ram 3, roller 43 passes over the entire circumference of cam track 45, thereby driving two oscillation cycles of control rod 36.

Feed rake crank 40 also rotates at two-fold the frequency of piston 3, i.e. feed rake crank 40 and cam track 45 rotate in a fixed phase relationship relative to one another. The orientation assumed by feed rake lever 15 in a certain phase of this motion depends on the contour of cam track 45, which can be defined substantially arbitrarily. By defining this contour in a suitable manner, it is thereby possible to accurately monitor the shape of path 47 described by agitator tines 13 over the course of a gathering stroke.

An unambiguous rule for how to create the circumference of cam track 45 in order to guarantee an ideal course of path 47 cannot be given since this course depends both on the contour of cam track 45 and on the shape and the relative motion phases of other components of the feed rake mechanism, such as coupling rod 37, feed rake lever 15, and feed rake crank 40 in particular. However, it should be understood that, independent of the influences of these components, the shape of path 47 can be optimized via a suitable shape of cam track 45 since substantially no basic conditions need to be considered when defining the shape of cam track 45 except for the desired shape of path 47. For example, the use of cam track 45 makes it possible in particular to attain a path shape in which the agitator tines enter entrance 11 of feed channel 7 substantially perpendicular to the longitudinal direction thereof, and the tips thereof then cover a long distance in the direct vicinity of base 17 before the motion abruptly changes direction and agitator tines 13 are withdrawn from feed channel 7.

Given that the agitator tines enter entrance 11 at a steep angle, it is guaranteed that the supplied crop material is captured across substantially the entire cross section of feed channel 7 and is pushed into the feed channel. Given that agitator tines 13 move in the direct vicinity of base 8 in the direction of exit 16, they prevent material from remaining uncompressed on base 8 and ensure that the crop body formed in the feed channel has a uniform density across the entire channel cross section. The contour of cam track 45 can also be used to define the point 47 of feed channel 7 at which agitator tines 13 exit, which, in turn, determines the dimensions of the precompressed crop body formed in a rear region of feed channel 7 on the other side of point 48. It is therefore sufficient to change the shape of cam track 45 in order to vary the dimensions of the crop body and adapt it to the dimensions of bale chamber 2 such that a bale having a homogeneous density is obtained therein.

The number of gathering strokes required to preshape a crop body—which has the density required to be conveyed further into bale chamber 2—in feed channel 7 is variable depending on the inflow of crop supplied by pick-up device 5. To determine when a crop body is finished, a swivelable door 23 is disposed in the vicinity of exit 16, against which the crop conveyed by the feed rake strokes backs up. If the pressure of the crop on door 23 exceeds a limit value, the crop body is finished, door 23 swivels to the side to expose the path into bale chamber 2, and telescopic rod 29 is simultaneously locked in a position having a minimal length. As a result, when piston crank 25 subsequently rotates, telescopic rod 29 swivels control rod 36 against the force of gas strut 44 in the clockwise direction, thereby pulling roller 43 away from cam track 45. As a result, feed rake lever 15 swivels in the clockwise direction about axle 39 which, in combination with the rotation of feed rake cranke 40, causes agitator tines 13 to follow the course of base 8 along approximately the entire length thereof, as indicated by a path 49 in FIG. 1, before they exit feed channel 7 at the level of exit 16 after they have pushed the crop body into bale chamber 2.

Sectors 50, which form the circumference of cam track 45, can each have a section that is shaped such that roller 43 remains in contact with the section even when telescopic rod 29 is length-locked. While roller 43 passes over this section, the path covered by agitator tines 13 is the same, regardless of whether a gathering stroke motion or a filling stroke motion is being performed at the moment. If this section is being passed over while agitator tines 13 are located in the front region of the feed channel, the path they cover in this front region is exactly the same in gathering strokes and filling strokes, and, since the shape of base 8 is adapted to this path, an excellent conveying effect can be ensured for both strokes.

It will be understood that each of the elements described above, or two or more together, may also find a useful application in other types of constructions differing from the types described above.

While the invention has been illustrated and described as embodied in an agricultural ram press, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letter Patent is set forth in the appended claims.

The invention claimed is:

1. An agricultural ram press, comprising:
a bale chamber;
a baling ram moveable in an oscillating manner in said bale chamber;
a feed channel;
a feed rake arranged in said feed channel and switchable between a gathering stroke motion which compresses crop in said feed channel and a filling stroke motion which moves the crop from said feed channel into said bale channel;
a drive for driving said feed rake and having a control rod interacting with an adjustable stop comprising a rotationally drivable cam track in order to control at least one of said motions of said feed rake; and
wherein a frequency of the motion of said feed rake is n-fold a frequency of motion of said baling ram, and wherein said cam track rotates at the frequency of motion of said baling ram and comprises n identical sectors.

2. The agricultural ram press as defined in claim 1, wherein said control rod carries a roller that impinges upon said cam track.

3. The agricultural ram press as defined in claim 1, wherein said feed rake has the motion in which said control rod interacts with said adjustable stop and which is the gathering stroke motion.

4. The agricultural ram press as defined in claim 1, wherein said adjustable stop drives a motion of said control rod having a same period as the motion of said feed rake.

5. The agricultural ram press as defined in claim 1, further comprising an elastic element, by which said control rod impinges upon said adjustable stop.

6. The agricultural ram press as defined in claim 5, further comprising a coupling element that holds said control rod away from said adjustable stop at least during a portion of said filling stroke motion.

7. The agricultural ram press as defined in claim 6, wherein said coupling element is a telescopic rod that is switchable between an adjustable-length state in which it does not overcome a force of said elastic element, and a locked-length state in which it transfers a force to said control rod that is sufficient for overcoming said elastic element.

8. The agricultural ram press as defined in claim 6, wherein said baling ram has a drive shaft which drives said coupling element.

9. An agricultural ram press, comprising:
a bale chamber;
a baling ram moveable in an oscillating manner in said bale chamber;
a feed channel;
a feed rake arranged in said feed channel and switchable between a gathering stroke motion which compresses crop in said feed channel and a filling stroke motion which moves the crop from said feed channel into said bale channel; and
a drive for driving said feed rake and having a control rod interacting with an adjustable stop to control at least one of said motions of said feed rake;
wherein said adjustable stop drives a motion of said control rod having a same period as the motion of said feed rake.

10. An agricultural ram press, comprising:
a bale chamber;
a baling ram moveable in an oscillating manner in said bale chamber;
a feed channel;
a feed rake arranged in said feed channel and switchable between a gathering stroke motion which compresses crop in said feed channel and a filling stroke motion which moves the crop from said feed channel into said bale channel;
a drive for driving said feed rake and having a control rod interacting with an adjustable stop to control at least one of said motions of said feed rake; and
an elastic element by which said control rod impinges upon said adjustable stop.

* * * * *